United States Patent
Ogle et al.

(10) Patent No.: US 9,351,029 B2
(45) Date of Patent: *May 24, 2016

(54) SET TOP/BACK BOX, SYSTEM AND METHOD FOR PROVIDING A REMOTE CONTROL DEVICE

(71) Applicant: Enseo, Inc, Richardson, TX (US)

(72) Inventors: Vanessa Ogle, Fairview, TX (US); Bill Fang, Plano, TX (US); Tom Miller, Plano, TX (US); David Straitiff, East Amherst, NY (US); Scott Horton, McKinney, TX (US)

(73) Assignee: Enseo, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,571

(22) Filed: Oct. 6, 2015

(65) Prior Publication Data

US 2016/0029065 A1 Jan. 28, 2016

Related U.S. Application Data

(63) Continuation of application No. 14/525,392, filed on Oct. 28, 2014, now Pat. No. 9,154,825, which is a continuation of application No. 14/177,876, filed on Feb. 11, 2014, now Pat. No. 8,875,195, which is a continuation of application No. 13/528,663, filed on Jun. 20, 2012, now Pat. No. 8,650,600.

(60) Provisional application No. 61/498,734, filed on Jun. 20, 2011.

(51) Int. Cl.
*H04N 7/18* (2006.01)
*H04N 21/422* (2011.01)
*H04N 21/41* (2011.01)

(52) U.S. Cl.
CPC ....... *H04N 21/4222* (2013.01); *H04N 21/4126* (2013.01); *H04N 21/4131* (2013.01); *H04N 21/42208* (2013.01); *H04N 21/42224* (2013.01)

(58) Field of Classification Search
CPC ............... H04N 21/4222; H04N 21/42208; H04N 21/4126; H04N 21/42224; H04N 21/4131

See application file for complete search history.

(56) References Cited

U.S. PATENT DOCUMENTS

| | | | |
|---|---|---|---|
| 6,263,503 B1 * | 7/2001 | Margulis | H04L 12/2812 348/E5.093 |
| 6,741,684 B2 | 5/2004 | Kaars | |
| 7,109,974 B2 * | 9/2006 | Kempisty | H04N 5/4403 345/173 |
| 8,286,204 B2 * | 10/2012 | Fukuda | G08C 23/04 348/734 |

(Continued)

*Primary Examiner* — Oschta Montoya
(74) *Attorney, Agent, or Firm* — Scott T. Griggs; Griggs Bergen LLP

(57) ABSTRACT

A set top/back box and system and method for providing a remote control device are disclosed. In one embodiment, one or more wireless transceivers are located within a housing, which also interconnectively includes television input/output, a processor, and memory. The set top/back box may establish a pairing with a programmable device, such as a proximate wireless-enabled interactive handheld device having a touch screen display, whereby formatted parallel audio-visual experience instructions, including virtual buttons, may be transmitted to the programmable device for display on the touch screen display to create an experience parallel to the experience on the television. The set top/back box receives and processes virtual remote control functionality input instructions from the programmable device to control amenities associated with the set top/back box.

20 Claims, 4 Drawing Sheets

(56) References Cited

U.S. PATENT DOCUMENTS

| | | |
|---|---|---|
| 8,650,600 B2 | 2/2014 | Ogle et al. |
| 8,875,195 B2 | 10/2014 | Ogle et al. |
| 2002/0059621 A1* | 5/2002 | Thomas ............... G06F 3/0481 |
| | | 725/87 |
| 2002/0143805 A1* | 10/2002 | Hayes ................ G06F 1/1626 |
| | | 345/169 |
| 2003/0073411 A1* | 4/2003 | Meade, II ............ G06F 1/1613 |
| | | 455/70 |
| 2005/0005297 A1* | 1/2005 | Lee ....................... H04H 40/90 |
| | | 725/81 |
| 2005/0035846 A1* | 2/2005 | Zigmond ............... G08C 17/02 |
| | | 340/5.22 |
| 2005/0097618 A1* | 5/2005 | Arling ................. H04L 12/2805 |
| | | 725/114 |
| 2005/0108751 A1 | 5/2005 | Dacosta |
| 2005/0262535 A1* | 11/2005 | Uchida ................. H04N 7/163 |
| | | 725/80 |
| 2010/0082485 A1 | 4/2010 | Lin et al. |
| 2010/0082491 A1 | 4/2010 | Rosenblatt et al. |
| 2010/0188279 A1 | 7/2010 | Shamilian et al. |
| 2011/0007018 A1 | 1/2011 | McKinley et al. |
| 2011/0067059 A1 | 3/2011 | Johnston et al. |

\* cited by examiner

SET TOP/BACK BOX, SYSTEM AND METHOD FOR PROVIDING A REMOTE CONTROL DEVICE

PRIORITY STATEMENT & CROSS-REFERENCE TO RELATED APPLICATIONS

This application is a continuation of U.S. patent application Ser. No. 14/525,392 entitled "Set Top/Back Box, System and Method for Providing a Remote Control Device" and filed on Oct. 28, 2014, in the names of Vanessa Ogle et al. and issued on Oct. 6, 2015, as U.S. Pat. No. 9,154,825; which is a continuation of U.S. patent application Ser. No. 14/177,876 entitled "Set Top/Back Box, System and Method for Providing a Remote Control Device" and filed on Feb. 11, 2014, in the names of Vanessa Ogle et al, and issued on Oct. 28, 2014, as U.S. Pat. No. 8,875,195; which is a continuation of U.S. application Ser. No. 13/528,663 entitled "Set Top/Back Box, System And Method For Providing A Remote Control Device" and filed on Jun. 20, 2012, in the names of Vanessa Ogle, et al., and issued on Feb. 11, 2014, as U.S. Pat. No. 8,650,600; which claims priority from U.S. Patent Application No. 61/498,734, entitled "Set Top/Back Box, System and Method for Providing a Remote Control Device" and filed on Jun. 20, 2011, in the names of Ogle et al.; both of which are hereby incorporated by reference for all purposes.

TECHNICAL FIELD OF THE INVENTION

This invention relates, in general, to remote control devices and, in particular, to set top/back boxes as well as systems and methods for providing a remote control device for a use in multi-unit environments.

BACKGROUND OF THE INVENTION

Remote controls are now considered a necessity for operating television devices wirelessly from a short line-of-sight distance without the need to approach the television. In multi-unit environments, such as furnished multifamily residences, hotels, and hospitals, for example, remote controls are usually small wireless handheld objects with an array of buttons for adjusting various settings such as television channel and volume. These devices have limited functionality and, as a result, there is a continuing need for improved remote controls.

SUMMARY OF THE INVENTION

It would be advantageous to achieve a remote control for use in a multi-unit environment that would improve upon existing limitations in functionality. It would also be desirable to enable a wireless solution that would mitigate or eliminate the cost of providing remote controls in multi-unit environments. To better address one or more of these concerns, systems and methods, including a set top/back box, for providing a remote control device are disclosed. In one embodiment of the set top/back box, one or more wireless transceivers are located within a housing, which also interconnectively includes television input/output, a processor, and memory. The set top/back box may establish a pairing with a programmable device, such as a proximate wireless-enabled interactive handheld device having a touch screen display, whereby formatted parallel audiovisual experience instructions, including virtual buttons, may be transmitted to the programmable device for display on the touch screen display to create a experience parallel to the experience on the television.

The set top/back box receives and processes virtual remote control functionality input instructions from the programmable device to control amenities associated with the set top/back box. In one implementation, the set top/back box is associated with a multi-unit environment such as a lodging environment and the amenities relate to a guest's stay at the lodging environment. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
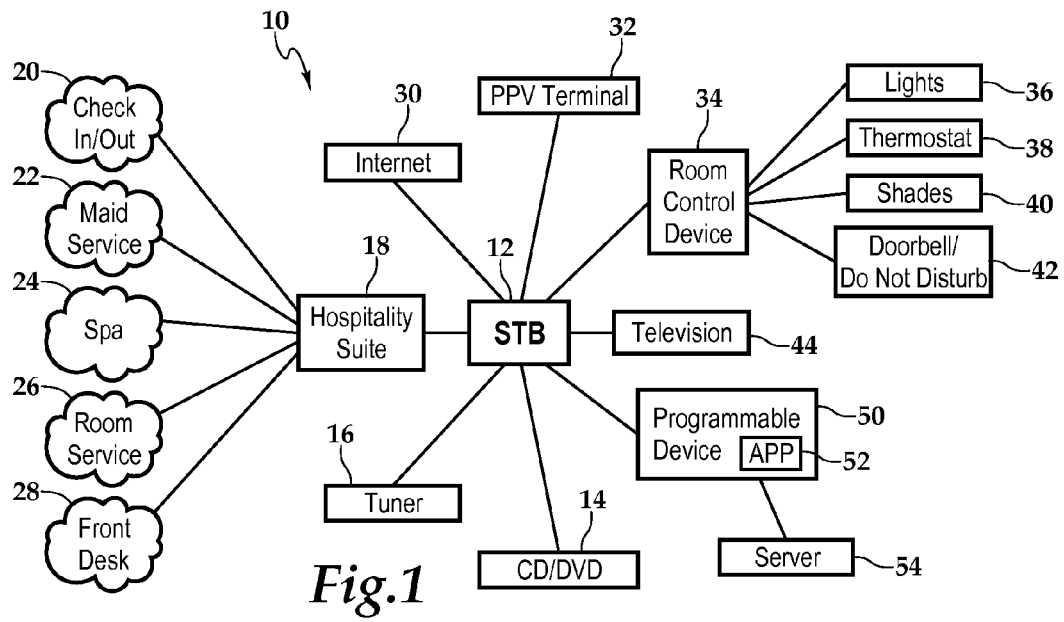
FIG. 1 is schematic block diagram depicting one embodiment of a system for providing a remote control device including a set top/back box, according to the teachings presented herein.

Referring initially to FIG. 1, therein is depicted a system for providing a remote control device in a multi-unit environment, such as a furnished multi-family residence, dormitory, lodging establishment, hotel, or hospital, which is schematically illustrated and designate 10. A set top/back box 12 is communicatively disposed with various amenities associated with the multi-unit environment. By way of example, and not by way of limitation, these amenities include a CD/DVD player 14, a radio tuner 16, and a hospitality suite 18, which represents a set of services, including check in/check out 20, maid service 22, spa 24, room service 26, and front desk 28. Additionally, the amenities shown include Internet service 30, a pay-per-view (PPV) terminal 32, and a room control device 34, representing control of the lights 36, thermostat 38, shades 40, and a doorbell/do not disturb designation 42. A television 44 is coupled to the set top/back box.

As discussed below, the set top/back box 12 provides a parallel audiovisual experience related to the content on the television 44 to a programmable device 50, which may in turn be used as a virtual remote control to control one or more of the amenities communicatively disposed with the set top/back box 12. The programmable device may be a wireless-enabled interactive handheld device that may be supplied or carried by the user or guest and may be selected from a range of existing devices, such as, for example iPads®, iPhones®, iPod Touch®, Android® devices, Blackberry® devices, and laptops. In one implementation, an application 52 installed from a server 54 enables the set top/back box 12 and programmable device 50 to be wirelessly paired.

Figure 2:
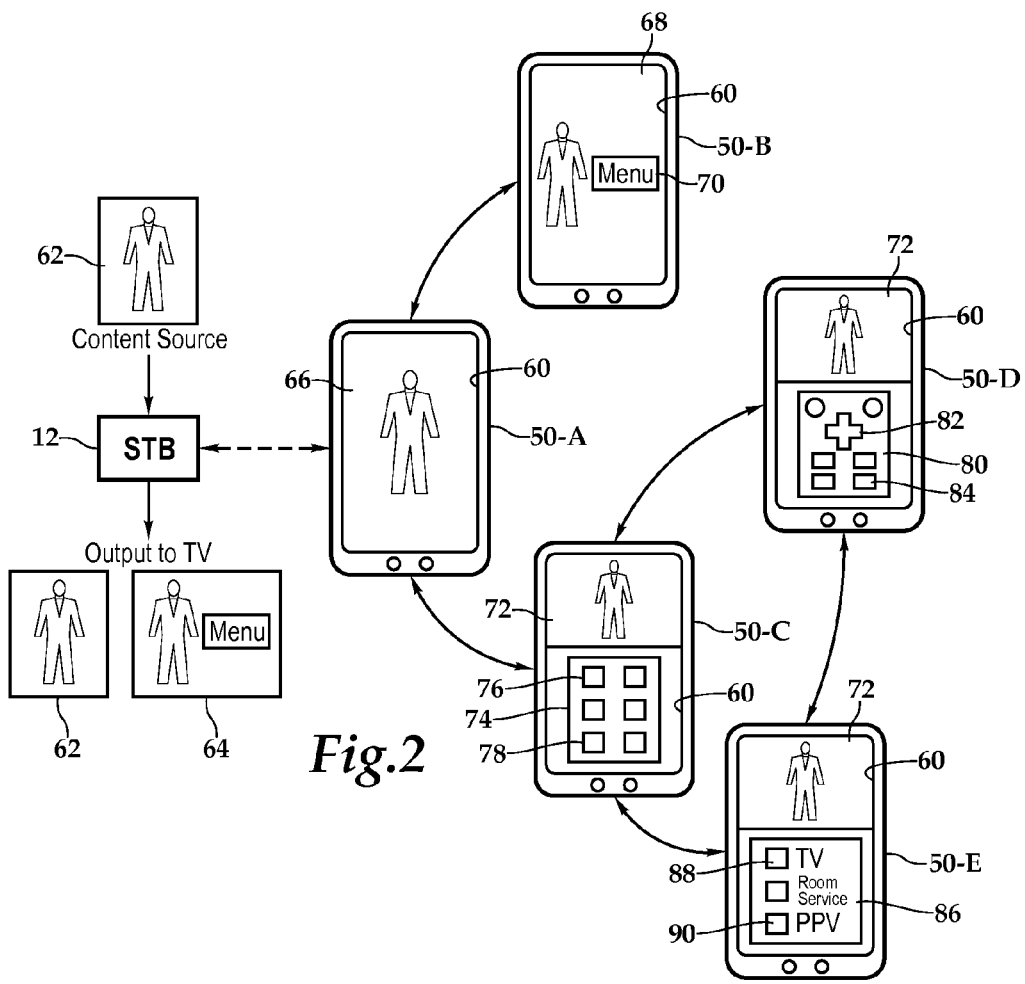
FIG. 2 is a schematic plan view depicting components of the system presented in FIG. 1 in further detail.

Referring now to FIG. 2, the pairing between the set top/back box 12 and the programmable device 50 having a touch screen display 60 is illustrated in further detail, wherein the alphabetical designations A-E used with programmable device 50 indicate particular selectable configurations of the programmable device 50, which are labeled programmable device 50-A through 50-E. As shown, the set top/back box 12 receives content 62 from a source and outputs to the television 44 either the content 62 or a modified version of the content 62, which includes a menu functionality and is designated content 64. The menu functionality may prompt the user to select between particular services and features offered, which may relate to the previously discussed amenities.

The programmable device 50-A includes content 66 on the touch screen display 60, which corresponds to content 62 on the television 44. As will be discussed in further detail below, the content 66 is formatted and/or scaled for the touch screen display 60. The programmable device 50-B includes content 68, which is a formatted and/or scaled version of content 64, on the touch screen display 60. The content 68 includes a virtual button 70 that if pressed by a user causes the corresponding functionality to the menu button 70 to occur. More specifically, the set top/back box receives a virtual remote control functionality instruction from the programmable device 50-B, which indicates that on touch screen 60 coordinates ($X_{PD}$, $Y_{PD}$) a touch-and-click operation occurred. The set top/back box 12 translates or de-scales the coordinates ($X_{PD}$, $Y_{PD}$) to coordinates ($X_{STB}$, $Y_{STB}$), which the set-top box 12 compares against a configuration profile in order to determine that the actuation of the menu button 70 presents a pay-per-view terminal guide listing. The set-top box 12 then sends a command signal to the PPV terminal 32 and the requested guide is then displayed.

The programmable device 50-C includes content 72 on the touch screen display 60. The content 72 corresponds to the content 62, however, the content 72 is formatted and/or scaled for viewing on only an upper portion of the touch screen display 60. A virtual remote control 74 is displayed on lower portion of the touch screen display 60. The virtual remote control 74 controls the CD/DVD player via virtual buttons, including virtual buttons 76, 78. Similar to the actuation of the menu button 70 with programmable device 50-B, the set top/back box 12 receives a virtual remote control functionality instruction from the programmable device 50-C, which indicates that on touch screen display 60 coordinates ($X_{PD}$, $Y_{PD}$) a touch-and-click operation occurred. The set top/back box 12 translates or de-scales the coordinates ($X_{PD}$, $Y_{PD}$) to coordinates ($X_{STB}$, $Y_{STB}$), which the set-top box 12 compares against a configuration profile in order to determine that the actuation of the button 76 initiates playing music on the CD/DVD player 14. The set-top box 12 then sends a command signal to the CD/DVD player 14 and music is played.

The programmable device 50-D having virtual remote control 80 for television 44 control with buttons 82, 84 and the programmable device 50-E for set top/back box 12 control having virtual remote control 86 with buttons 88, 90 have similar functionality to the programmable device 50-B and 50-C. In one implementation, a user may toggle between the full screen television presentation of the programmable device 50-A and the split screen television/remote presentation of the programmable devices 50-B through 50-E by selectively swiping or clicking a predetermined portion of the touch screen display 60. Once in the split screen television/remote presentation, the user may selectively switch between an array of virtual remote controls corresponding to the configuration profile in the set top/back box 12, which correspond to the various amenities in the multi-unit environment.

Figure 3:
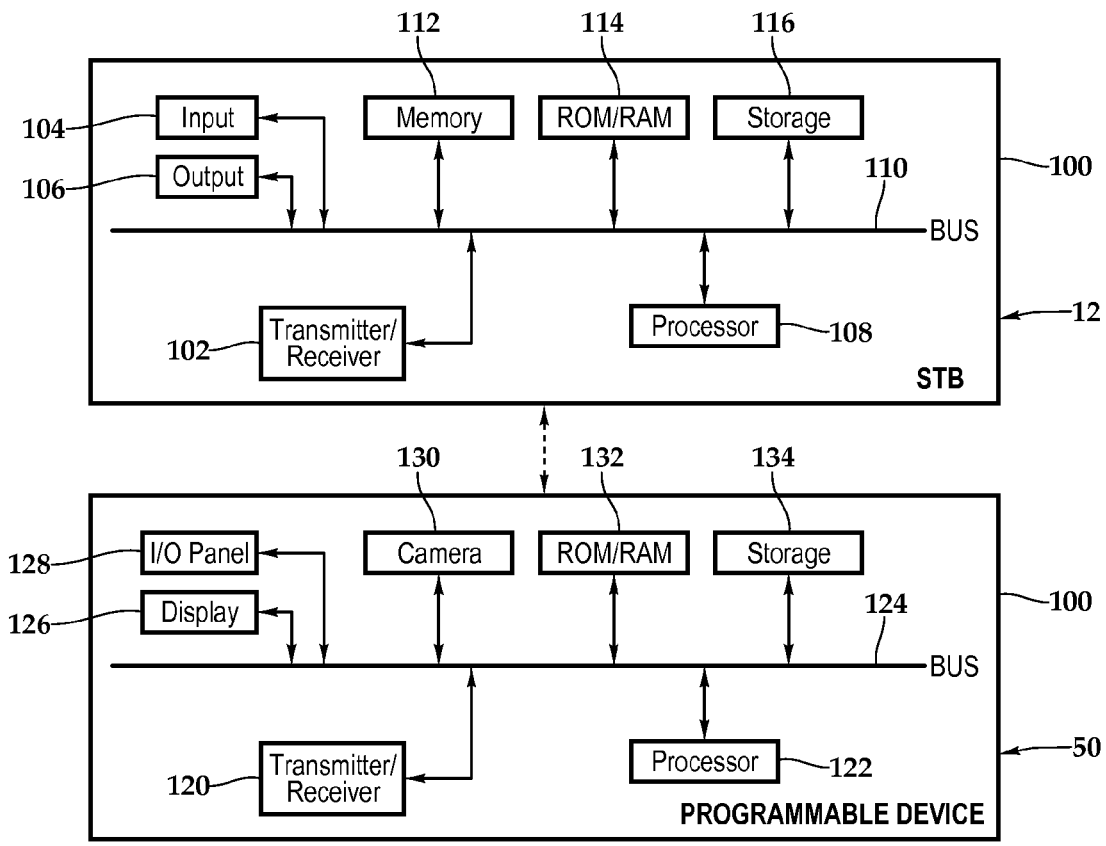
FIG. 3 is a schematic block diagram depicting the set top/back box and a programmable device, both components of the system presented in FIG. 1.

Referring now to FIG. 3, the set top/back box 12 and programmable device 50 are illustrated in further detail. With regard to the set top/back box 12, a housing 100 includes one or more wireless transceivers 102 located therein in order to communicate with the programmable device 50, which, as discussed, may have the form of a proximate wireless-enabled electronic device or interactive handheld device, for example. Communication between the programmable device 50 and the set top/back box 12 may be enabled by a variety of wireless methodologies, including 802.11, 3G, 4G, Edge, WiFi, ZigBee, near field communications (NFC), and Bluetooth, for example. Also, infrared (IR) may utilized. If direct communication is not possible, communication between the interactive device and the set top/back box may be made through indirect communication protocols. For example, a proxy service may be used to route messaging to the interactive device by way of the Internet or 802.11 communication.

A television input 104 and a television output 104 are also secured in the housing 100 in order to receive content from a source in a multi-unit environment and forward content to a television, such as television 44. A processor 108 located within the housing is coupled to the one or more wireless transceivers 102 and the television input 104 and the television output 106 by a bus 110 or other architecture. A memory 112, ROM/RAM 114, and storage 116 are accessible to the processor 108 and include processor-executable instructions that, when executed, cause the processor to execute a series of operations.

The processor-executable instructions establish a pairing between the amenities and the set top/back box 12 such that the set top/back box 12 is configured to control each of the amenities in the multi-unit environment. The processor-executable instructions specify a search operation to identify the proximate wireless-enabled interactive handheld device. This search operation utilizes the at least one or more wireless transceivers 102 to wirelessly identify the programmable device. As previously discussed, the programmable device 50 may include an application which assists in the searching or alternatively a NFC protocol may be utilized for identification. In a further non-limiting variation, a BlueTooth challenge-response is utilized or instructions on a gateway television page are presented. In many embodiments of the search methodology, physical proximity between the programmable device 50 and the set top/back box 12 is leveraged to establish a pairing therebetween.

The processor-executable instructions also establish a pairing between the programmable device 50 and the set top/back box 12. Additionally, the processor-executable instructions send parallel audiovisual experience instructions to the programmable device 50. This enables the parallel audiovisual experience on the programmable device 50. The instructions may include instructions for virtual buttons on the touch screen display 60. The virtual buttons are associated with a particular amenity, as previously discussed. Standard remote control functionality input instructions are embodied as virtual remote control functionality input instructions to be received and processed by the set top/back box 12 from the programmable device 50. The virtual remote control functionality input instructions received from the programmable device are processed based on the location of a touch-and-click operation on the touch screen display. The location of the touch-and-click operation is translated by the set top/back box 12 into a command associated with an amenity based on the location of the touch-and-click operation and the parallel audiovisual experience instructions provided to the programmable device 50.

The configuration profile is associated with the memory 112 and processor-executable instructions that enable the set-top box 12 to control the amenities in the multi-room environment. The configuration profile, for each amenity, includes instructions for virtual buttons on the touch screen display, and instructions for associating virtual remote control functionality input instructions from the touch screen display with commands that are handled by the set top/back box 12.

The programmable device 50 may be a wireless communication device of the type including various fixed, mobile, and/or portable devices. To expand rather the limit the previous discussion of the programmable device 50, such devices may include, but are not limited to, cellular or mobile telephones, two-way radios, personal digital assistants, digital music players, Global Position System units, and so forth. The programmable device 50 may include a transmitter/receiver 120, processor 122, bus 124, display 126, I/O panel 128, a camera 130, ROM/RAM 132, and storage 134. It should be appreciated that although a particular architecture is explained, other designs and layouts are within the teachings presented herein.

In operation, the teachings presented herein permit a programmable device 50 such as a smart phone, tablet or laptop to be utilized as an intelligent remote control device to interactively communicate with a set top/back box that operates the television and/or room automation in a multi-dwelling environment. Additionally, the systems and methods presented herein may be employed by an installer or maintenance staff worker to create an interactive tool for the deployment, diagnosis and maintenance of a set top/back box.

In the operation embodiment being described, the programmable device 50 may be "paired" on a temporary basis to the set top/back box for use during the stay of an occupant. The programmable device 50 may communicate via the set top/back box 12 with the television, a property management system or customer relationship management solution to be automatically configured for VIP guests and to clear settings after check-out for privacy.

The system and method may provide a menu-driven environment which may duplicate content on the television, provide related content, furnish a parallel experience, or provide controls for the environment in the room. For example, with respect to the parallel experience, a channel guide may be provided. By way of another example, providing controls for the environment may include enabling the thermostat and lighting controls from the interactive device by way of the set top/back box.

Thus, the systems and methods disclosed herein may enable users to use existing electronic devices as a temporary remote control device to control a television via a set top/back box. Therefore the systems and methods presented herein avoid the need for additional or expensive high functionality remote controls. In this respect, the teachings presented herein also include providing the software and/or application for the electronic device or interactive handheld device. The application, to the extent needed, may be downloaded from the Internet or alternatively made available by download from the set top/back box.

Figure 4:
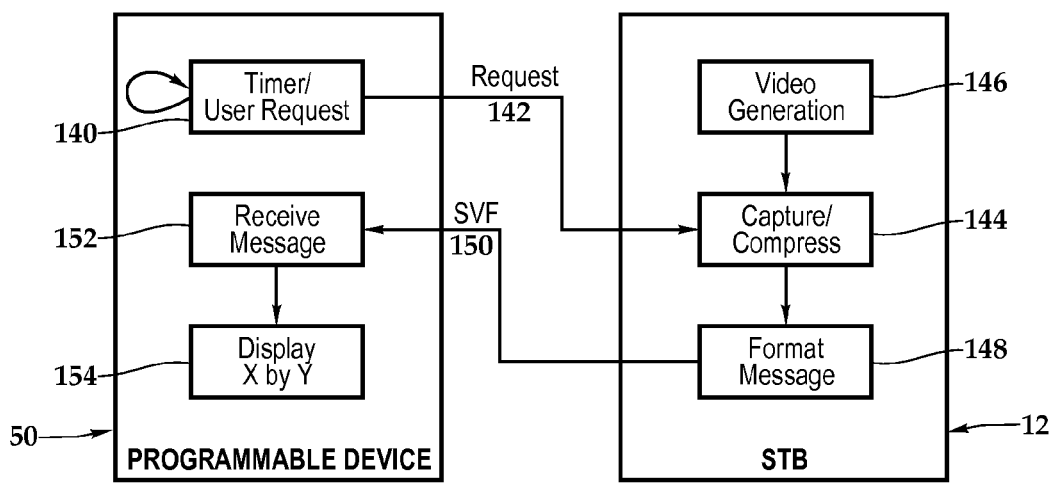
FIG. 4 is a schematic data flow diagram depicting one embodiment of single frame signaling between the set top/back box and the programmable device.

Referring to FIG. 4, one embodiment of single frame signaling between the set top/back box 12 and the programmable device 50 is depicted. At operational module 140, a timer or user request generates a request 142 from the programmable device 50, which is received by the capture/compress module 144 at the set top/back box 12. The operational module 144 responsive thereto, receives a video generation signal from the operational module 146, which is $F_{output}$ ($X_{STB}$, $Y_{STB}$). This signal is forwarded to operational module 148, where the signal is formatted and/or scaled for the particular programmable device 50, based on the pairing established between the set top/back box 12 and the programmable device 50. That is, the operational module 148 formats and/or scales the signal from $F_{output}(X_{STB}, Y_{STB})$, with individual pixels being ($X_{STB}$, $Y_{STB}$), to $F_{device}$ ($X_{PD}$, $Y_{PD}$) with individual pixels being ($X_{PD}$, $Y_{PD}$). The formatted and/or scaled signal $F_{device}(X_{PD}, Y_{PD})$ is sent via signal video frame (SVF) signal 150 from the set top/back box 12 and received at operational module 152, where the signal and message are received and displayed at operational module 154 on the touch screen display 60 of the programmable device 50. In this manner, parallel audiovisual experience instructions are provided by the set top/back box 12 to the programmable device 50 to create a parallel experience, which as discussed previously, may include virtual buttons. It should be appreciated that the various operational modules described in FIG. 4 and herein may be executed by the hardware, software, and firmware architectures depicted in FIG. 3, for example.

Figure 5:
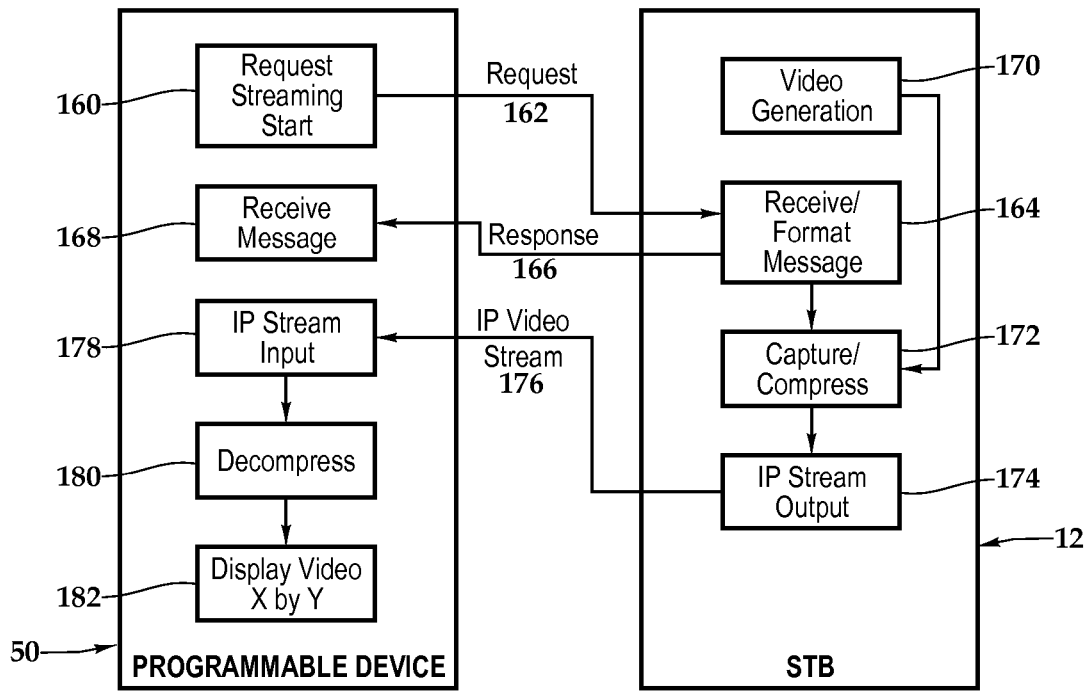
FIG. 5 is a schematic data flow diagram depicting one embodiment of streaming video between the set top/back box and the programmable device.

FIG. 5 depicts one embodiment of streaming video between the set top/back box 12 and the programmable device 50. At operational module 160 a request 162 originates from the programmable device 50 and is received by operational module 164, where the message is received and a response 166 is transmitted back to the programmable device 50, indicating that the parameters. The response 166 is received at operational module 168. With reference again to the set top/back box 12, an operational module 170 generates the streaming video, which is captured and compressed at operational module 172, prior to being formatted, in one embodiment, as an IP stream output at operational module 174. After transmission from the set top/back box 12, the IP video stream 176 is received by the programmable device at operational module 178, and then decompressed at operational module 180 prior to being displayed at operational module 182. Similar to the discussion in FIG. 4, the formatting and scaling involves transforming $F_{output}$ ($X_{STB}$, $Y_{STB}$), with individual pixels being ($X_{STB}$, $Y_{STB}$), to $F_{device}$ ($X_{PD}$, $Y_{PD}$), with individual pixels being ($X_{PD}$, $Y_{PD}$) and reflecting a substantially realtime stream rate. In this manner, parallel audiovisual experience instructions are provided by the set top/back box 12 to the programmable device 50 to create a parallel experience, which as discussed previously, may include virtual buttons.

Figure 6:
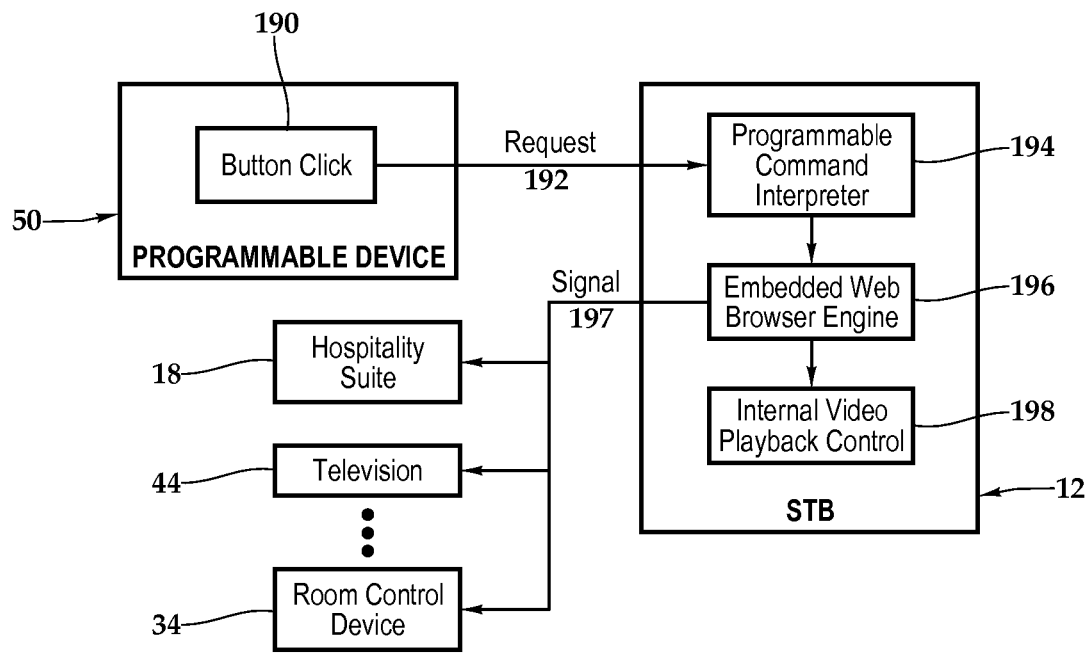
FIG. 6 is a schematic data flow diagram depicting one embodiment of control signaling between the set top/back box and the programmable device.

FIG. 6 depicts one embodiment of control signaling between the set top/back box 12 and the programmable device 50. At the programmable device, a button click or touch-and-click operation is detected at operational module 190, which then sends request 192. The button click may be associated with the actuation of a virtual button, which forms a portion of the parallel audiovisual experience. The set top/back box 12 receives the request 192 and operational module 194 executes a programmable command interpreter based on a configuration profile to determine the individual pixels ($X_{STB}$, $Y_{STB}$) associated with touch-and-click operation at ($X_{PD}$, $Y_{PD}$). Based on the parallel audiovisual instructions sent from the set top/back box 12 and the received location of the touch-and-click operation, the operational module 194 determines the command and amenity associated with the actuation of the virtual button actuation on the programmable device 50. In the particular illustrated embodiment, at operational module 196, an embedded web browser engine 196, working with operational module 198, which handles internal video playback control, forwards a command signal 197 to the appropriate amenity.

Figure 7:
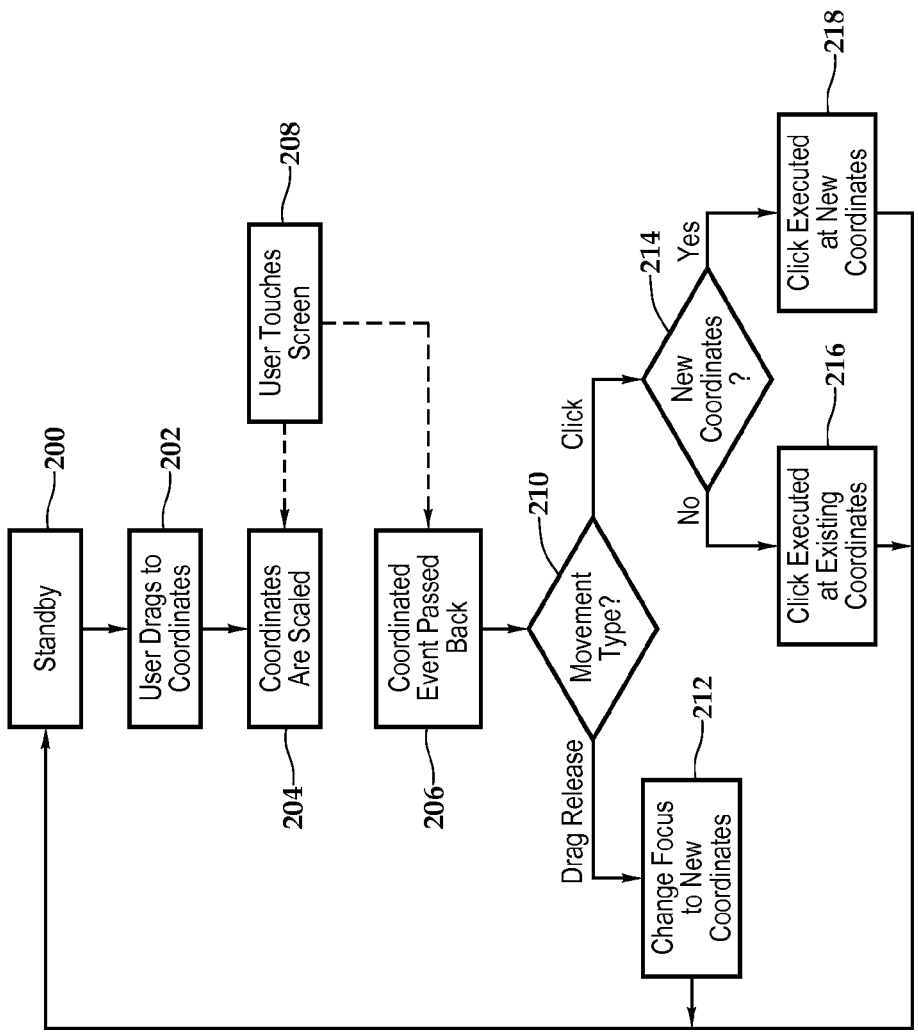
FIG. 7 is a flow chart diagram depicting one embodiment of a method for user touch panel display command execution.

FIG. 7 depicts one embodiment of a method for user touch panel display command execution. At block 200, the methodology is in standby. At block 202, a user drags his or her finger to particular coordinates on the touch screen display of the programmable device. At block 204, the event is transmitted from the programmable device and received by the set top/back box, where the coordinates are translated from the programmable device coordinates to the set top/back box coordinates. At block 206, the event is passed back to the programmable device and continued to be monitored. As shown by the dashed lies from block 208, it should be understood that during this process the user may continue to touch the screen.

At decision block 210, the movement type is determined and if a drag release occurred, then the focus of the methodology changes to the new coordinates. On the other hand, if a click movement occurs, then at decision block 214, the methodology forms a tree depending on whether or not the click occurred at existing coordinates (block 216) or new coordinates (block 218). These events are monitored for proper reporting to the set top/back box 12 from the programmable device 50 of the location and type of touch-and-click operation, which may include a drag and/or release, occurs.

Figure 8:
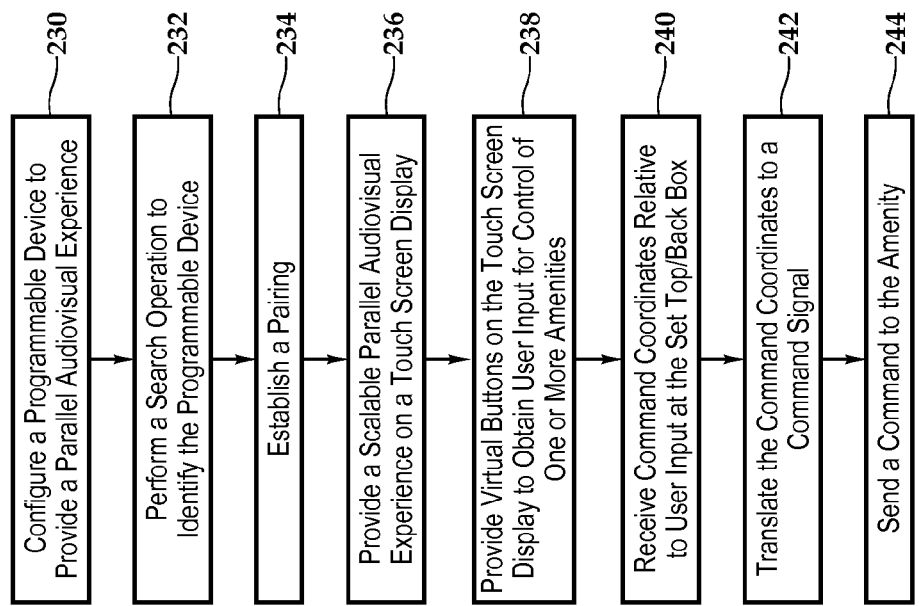
FIG. 8 is a flow chart depicting one embodiment of a method for providing a remote control device, according to the teachings presented herein.

FIG. 8 depicts one embodiment of a method for providing a remote control device, according to the teachings presented herein. At block 230, the programmable device is configured to provide a parallel audiovisual experience. In one implementation, this may involve using an existing application on the programmable device, such as a browser, or downloading a new application. At block 232, a search, which may be active or passive, is performed by the set top/back box to identify a physically proximate programmable device in the multi-room environment. At block 234, a pairing is established prior to a scalable parallel audiovisual experience being provided at block 236 on the touch screen display of the programmable device. The audiovisual experience is parallel to the television experience being provided by the set top/back box. As noted by block 238, this experience may include providing virtual buttons integrated within the audiovisual experience or two or more panels within the touch screen display showing the television experience and one or more virtual remote controls. As previously discussed, the virtual remote controls and buttons each correspond to amenities under the control of the set top/back box.

At block 240, command coordinates are received from the programmable device at the set top/back box and these command coordinates are translated into a command signal intended for an amenity associated with the set top/back box based on the location of the touch-and-click operation, which more generally may be understood as a user interaction, and the parallel experience being provided by the set top/back box to the programmable device. At block 244, the command is sent from the set top/back box to the amenity.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A set top/back box comprising:
   a housing;
   one or more wireless transceivers associated with the housing, the one or more wireless transceivers operable to communicate with a proximate wireless-enabled interactive handheld device;
   a television input and a television output secured in the housing, the television input and the television output for receiving content from a source in a lodging environment and forwarding content to a television;
   a processor coupled to the one or more wireless transceivers and the television input and the television output;
   a memory accessible to the processor, the memory including processor-executable instructions that, when executed, cause the processor to:
   send formatted parallel audiovisual experience instructions to a proximate wireless-enabled interactive handheld device paired with the set top/back box, wherein the formatted parallel audiovisual experience instructions are operable to provide a parallel experience,
   provide instructions for virtual buttons on a touch screen display associated with the proximate wireless-enabled interactive handheld device, the virtual buttons being associated with a particular amenity,
   receive and process virtual remote control functionality input instructions from the proximate wireless-enabled interactive handheld device, and
   send a command to the particular amenity;
   a configuration profile associated with the memory and processor-executable instructions that enables the set top/back box to control a plurality of proximate amenities in a multi-room environment, the plurality of proximate amenities including the particular amenity, the plurality of proximate amenities being associated with a user's stay in the lodging environment;
   the configuration profile, for each amenity of the plurality of amenities, including instructions for virtual buttons on a touch screen display, and instructions for associating virtual remote control functionality input instructions from the touch screen display with commands; and
   wherein the formatted parallel audiovisual experience instructions include instructions that selectively display one or more sets of virtual buttons on the touch screen display, the one or more sets of virtual buttons relate to the plurality of amenities.

2. The set top/back box as recited in claim 1, wherein the one or more wireless transceivers are configured to communicate with a standard selected from the group consisting of infrared (IR), 802.11, 3G, 4G, Edge, WiFi, ZigBee, near field communications (NFC), and Bluetooth.

3. The set top/back box as recited in claim 1, wherein the formatted parallel audiovisual experience instructions include instructions that scale an image on the television to the touch screen display on the proximate wireless-enabled interactive handheld device.

4. The set top/back box as recited in claim 1, wherein the formatted parallel audiovisual experience instructions include instructions that scale, on a frame-by-frame basis, an image on the television to the touch screen display on the proximate wireless-enabled interactive handheld device.

5. The set top/back box as recited in claim 1, wherein the formatted parallel audiovisual experience instructions include instructions that scale, on a streaming basis, an image on the television to the touch screen display on the proximate wireless-enabled interactive handheld device.

6. The set top/back box as recited in claim 1, wherein the formatted parallel audiovisual experience instructions include instructions that display virtual buttons on a second portion of the touch screen display.

7. The set top/back box as recited in claim 1, wherein the plurality of amenities comprise of amenities selected from the group consisting of CD/DVD players, tuners, hospitality suite services, Internet service, pay-per-view terminals, room control devices, and televisions.

8. The set top/back box as recited in claim 1, wherein the processor being caused to receive and process virtual remote control functionality input instructions from the proximate wireless-enabled interactive handheld device further comprises receiving and processing the location of a touch-and-click operation on the touch screen display.

9. The set top/back box as recited in claim 1, wherein the one or more transceivers are internal to the housing.

10. The set top/back box as recited in claim 1, wherein the one or more transceivers are external to the housing.

11. A set top/back box comprising:
a housing;
one or more wireless transceivers associated with the housing, the one or more wireless transceivers operable to communicate with a proximate wireless-enabled interactive handheld device;
a television input and a television output secured in the housing, the television input and the television output for receiving content from a source in a lodging environment and forwarding content to a television;
a processor coupled to the one or more wireless transceivers and the television input and the television output;
a memory accessible to the processor, the memory including processor-executable instructions that, when executed, cause the processor to:
send formatted parallel audiovisual experience instructions to a proximate wireless-enabled interactive handheld device paired with the set top/back box, wherein the formatted parallel audiovisual experience,
provide instructions for virtual buttons on a touch screen display associated with the proximate wireless-enabled interactive handheld device, the virtual buttons being associated with a particular amenity,
receive and process virtual remote control functionality input instructions from the proximate wireless-enabled interactive handheld device, and
send a command to the particular amenity;
a configuration profile associated with the memory and processor-executable instructions that enables the set top/back box to control a plurality of proximate amenities in a multi-room environment, the plurality of proximate amenities including the particular amenity, the plurality of proximate amenities being associated with a user's stay in the lodging environment;
the configuration profile, for each amenity of the plurality of amenities, including instructions for virtual buttons on a touch screen display, and instructions for associating virtual remote control functionality input instructions from the touch screen display with commands; and
wherein the formatted parallel audiovisual experience instructions include instructions that selectively display one or more sets of virtual buttons on a second portion of the touch screen display, the one or more sets of virtual buttons corresponding to the plurality of amenities.

12. The set top/back box as recited in claim 11, wherein the one or more wireless transceivers are configured to communicate with a standard selected from the group consisting of infrared (IR), 802.11, 3G, 4G, Edge, WiFi, ZigBee, near field communications (NFC), and Bluetooth.

13. The set top/back box as recited in claim 11, wherein the formatted parallel audiovisual experience instructions include instructions that scale an image on the television to the touch screen display on the proximate wireless-enabled interactive handheld device.

14. The set top/back box as recited in claim 11, wherein the formatted parallel audiovisual experience instructions include instructions that scale, on a frame-by-frame basis, an image on the television to the touch screen display on the proximate wireless-enabled interactive handheld device.

15. The set top/back box as recited in claim 11, wherein the formatted parallel audiovisual experience instructions include instructions that scale, on a streaming basis, an image on the television to the touch screen display on the proximate wireless-enabled interactive handheld device.

16. The set top/back box as recited in claim 11, wherein the one or more transceivers are internal to the housing.

17. The set top/back box as recited in claim 11, wherein the one or more transceivers are external to the housing.

18. A set top/back box comprising:
a housing;
one or more wireless transceivers associated with the housing, the one or more wireless transceivers operable to communicate with a proximate wireless-enabled interactive handheld device;
a television input and a television output secured in the housing, the television input and the television output for receiving content from a source in a lodging environment and forwarding content to a television;
a processor coupled to the one or more wireless transceivers and the television input and the television output;
a memory accessible to the processor, the memory including processor-executable instructions that, when executed, cause the processor to:
send formatted parallel audiovisual experience instructions to a proximate wireless-enabled interactive handheld device paired with the set top/back box, wherein the formatted parallel audiovisual experience instructions are operable to provide a parallel experience,
provide instructions for virtual buttons on a touch screen display associated with the proximate wireless-enabled interactive handheld device, the virtual buttons being associated with a particular amenity,
receive and process virtual remote control functionality input instructions from the proximate wireless-enabled interactive handheld device, and
send a command to the particular amenity; and wherein the formatted parallel audiovisual experience instructions include instructions that selectively display one or more sets of virtual buttons on a second portion of the touch screen display, the one or more sets of virtual buttons corresponding to the plurality of amenities.

19. The set top/back box as recited in claim 18, wherein the one or more wireless transceivers are configured to communicate with a standard selected from the group consisting of infrared (IR), 802.11, 3G, 4G, Edge, WiFi, ZigBee, near field communications (NFC), and Bluetooth.

20. The set top/back box as recited in claim 18, wherein the formatted parallel audiovisual experience instructions include instructions that scale an image on the television to the touch screen display on the proximate wireless-enabled interactive handheld device.

* * * * *